United States Patent [19]

Krivoshiev

[11] 4,192,999

[45] Mar. 11, 1980

[54] CONTROL DEVICE FOR AUTOMATIC COLOR-SORTING APPARATUS

[75] Inventor: Georgi P. Krivoshiev, Sofia, Bulgaria

[73] Assignee: DSO "Bulgarplod", Sofia, Bulgaria

[21] Appl. No.: 925,647

[22] Filed: Jul. 18, 1978

[51] Int. Cl.$^{2}$ .............................................. G01N 21/30

[52] U.S. Cl. ...................................... 250/561; 250/560

[58] Field of Search ................... 250/560, 561, 223 R; 356/384, 385, 386, 387

[56] References Cited

U.S. PATENT DOCUMENTS 3,781,554 12/1973 Krivoshiev et al. .

*Primary Examiner*—David C. Nelms

*Assistant Examiner*—Darwin R. Hostetter

[57] ABSTRACT

A control-device for automatic color-sorting apparatus, comprising a light source located in front of a photorelay and a computing circuit, wherein the photorelay is coupled with and in the computing circuit, comprising a first linear-voltage generator, the output of which is coupled with a memory and a second linear-voltage generator, wherein the outputs of the second linear-voltage generator and the memory are coupled with an adder, the output of which, together with the output of the reference-voltage source are coupled with both inputs of a zero-member, the first linear voltage generator having one-half the speed of voltage-increase of the second linear-voltage generator.

3 Claims, 3 Drawing Figures

CONTROL DEVICE FOR AUTOMATIC COLOR-SORTING APPARATUS

This invention relates to a control-device for automatic color-sorting apparatus intended for the sorting of large food products and other objects, the device insuring an accurate synchronization of the testing operations with the movement of the objects irrespective of differences in their sizes.

The device of the invention may be employed to advantage, for example, in the apparatus disclosed in KRIVOSHIEV ET AL U.S. Pat. No. 3,781,554, to replace the means employed therein for determining the moment of measuring objects being sorted and the duration of the measuring operation.

There are known devices which produce a synchronizing pulse by means of a photorelay operated by the objects supplied to the photometric system of an automatic color-sorting apparatus. In some of these, such as FRAENKEL U.S. Pat. No. 3,066,797 and WARD U.S. Pat. No. 3,060,790, a synchronizing pulse switches-on the circuit of the color-sorting photocell before the object enters the range of the testing portion of the apparatus and switches it off after the object exits therefrom. This synchronization is used in the sorting of fine-granulated objects and in the scanning of the surface of large particles in order to detect surface spots and other defects. In other automatic machines, the device generates a short-time synchronizing pulse of a given duration, so that the color-sorting or sampling occurs at a time when the object is in the center of the testing area or portion of the machine. Thus in BARTLETT U.S. Pat. No. 2,988,219, for example, the objects are "snap-shotted" and sorted or sampled according to their integral color-evaluation, provided that there is a similarity of size and form among the various objects being tested.

All the above-described prior devices, however, are unable to insure a true indication of the moment when the geometric centers of the different sized objects coincide with the center of the testing area. An indication of such moment is indispensable if errors arising from the specular reflections when sampling the objects in accordance with their integral exterior color and their internal quality by means of the light absorbtion method are to be avoided. The known devices based upon optical elements disposed in the range of the testing area require a more sophisticated design of the photometric system if the sorting ability of the said automatic control machines is not to be decreased.

The object of the present invention is to avoid these drawbacks by providing a control device for automatic color-sorting apparatus which insures the synchronization of the testing operations with the moment when the geometric centers of the moving objects, irrespective of their size, coincide with the center of the testing area; in such device the optical elements are beyond the range of the testing area or system of the machine.

The control device of the invention is provided with a light source, a photorelay or photoreceiver, and a computing circuit, and meters the size of the object which is passing between a light source and the photorelay, thus determining the moment when the geometric center of an object coincides with a definite point in its path of travel. The photorelay is coupled with a first linear-voltage generator, the outputs of which is connected with a memory and a second linear-voltage generator, the outputs of these latter being coupled with an adder. The output of the adder, as well as the output of a reference voltage source, are coupled with both inputs of a zero-member.

The first linear-voltage generator has a speed of voltage increase which is one-half that of the second linear-voltage generator. The light source and the photorelay are located beyond the range of the testing area of the automatic color-sorting machine. The first and second linear-voltage generators, the memory, and the adder can be integrated into a single generator with a sequential alteration of the linearly increasing voltage in a 1:2 ratio.

The advantages of the device in accordance with the invention reside in the simplified design of the photometric system for automatic color-sorting machines and their ability to determine the color of objects when the center of each color-tested object is disposed at the same point.

The device according to the invention is disclosed in a preferred embodiment in the accompanying drawings, wherein.

Figure 1:
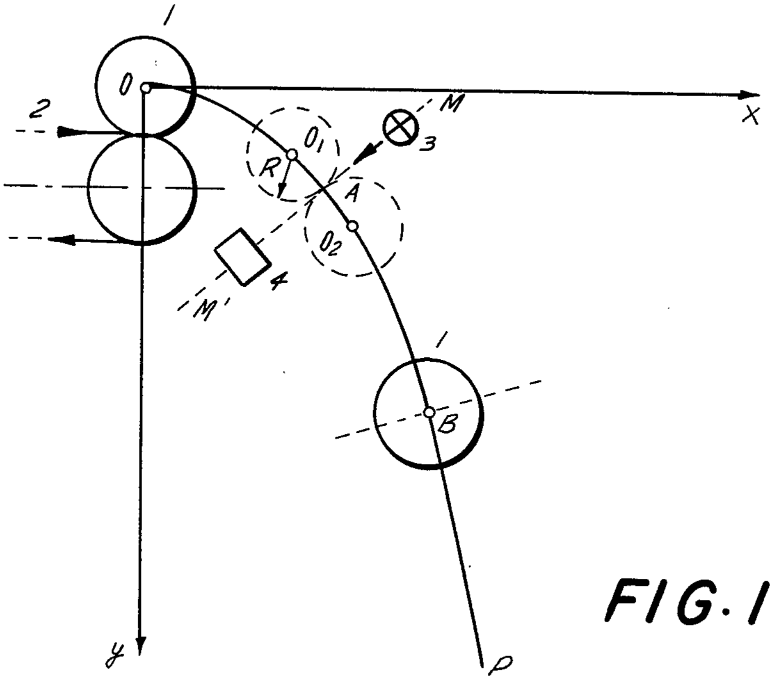
FIG. 1 is a schematic view showing the path of the objects and the location of the photorelay with respect to the testing area.

Turning now to FIG. 1, an object 1, shown for convenience as a sphere, is carried at a constant speed by a conveyor belt 2. When the center of the object 1 coincides with the center of the coordinate system XOY, the object starts a free fall along the path P. Again, along the direction M-M and perpendicularly to the tangent point A, a narrow light beam from the light source 3 is directed toward a photorelay 4. When the object 1 reaches the point A, the light beam directed toward the photorelay is cut off, and this condition continues until the center of the object shifts from point $O_1$ to point $O_2$. The point A is spaced from the center of the testing position B by only a short distance AB and the speed of the object 1 from point A to point B changes insignificantly with respect to the relationship defining the time in which the center of the object 1 covers the distance $O_2$-B, so as to coincide with the center B of the testing area.

Figure 2:
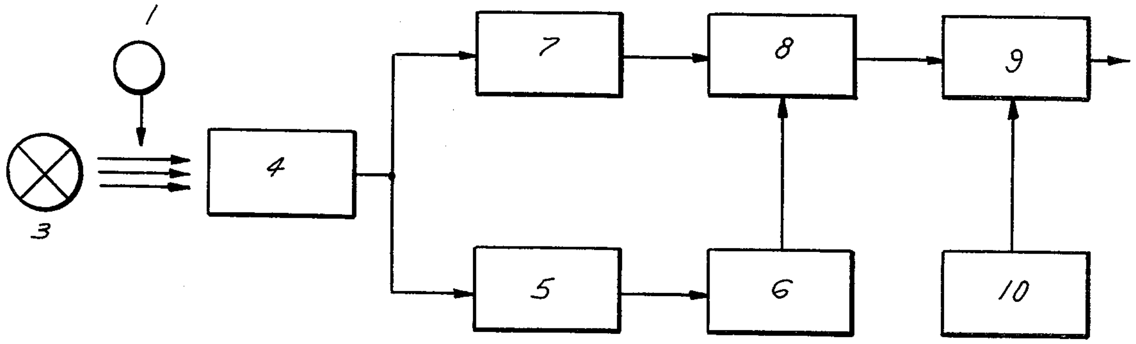
FIG. 2 is a block diagram of the device.

The device shown schematically in FIG. 2 comprises a light source 3, a photorelay or receiver 4, two linearly rising voltage generators 5 and 7, a memory 6, an adder 8, a standard voltage source 10, and a zero-reader 9.

The light source 3 and the photoreceiver or photorelay 4 are disposed beyond the range of the testing (control-metering) area, as indicated in FIG. 1. The photorelay 4 is coupled with both linear-voltage generators 5 and 7. The first linear-voltage generator 5 is coupled with the memory 6, the output of which is coupled with one of the inputs of the adder 8, while the other input of the adder 8 is coupled with the second linear-voltage generator 7. The outputs of the adder 8 and the standard-voltage source 10 are coupled with both inputs of the zero-member 9, which emits an output or timing signal.

When the object 1 cuts off the light beam, the photorelay 4 is energized, the front of the pulse generated by the photorelay 4 energizing the generator 5, which in turn generates a linear voltage at a speed Vu/2. After the object being tested crosses the line M-M as shown in FIG. 1, the photorelay 4 returns to its initial, de-energized condition, and the rear boundary of its output pulse cuts off the generator 5 and cuts in the second generator 7. The generator 7 generates a linear voltage at a speed Vu. The signal obtained from the first generator 5 is fed into the memory 6 and is added to the signal obtained from the second generator 7 by means of the adder 8. The result obtained is compared with the standard or reference signal Uz produced by the reference voltage source 10. At the moment of equality of such two voltages, the zero-member 9 produces a synchronized pulse, such pulse operating the testing (control-metering) system of the color-sorting control for an automatic sorting machine (not shown). The output or control signal is emitted by the control device about described at that moment when the center of the object being tested coincides with the point B shown in FIG. 1.

Figure 3:
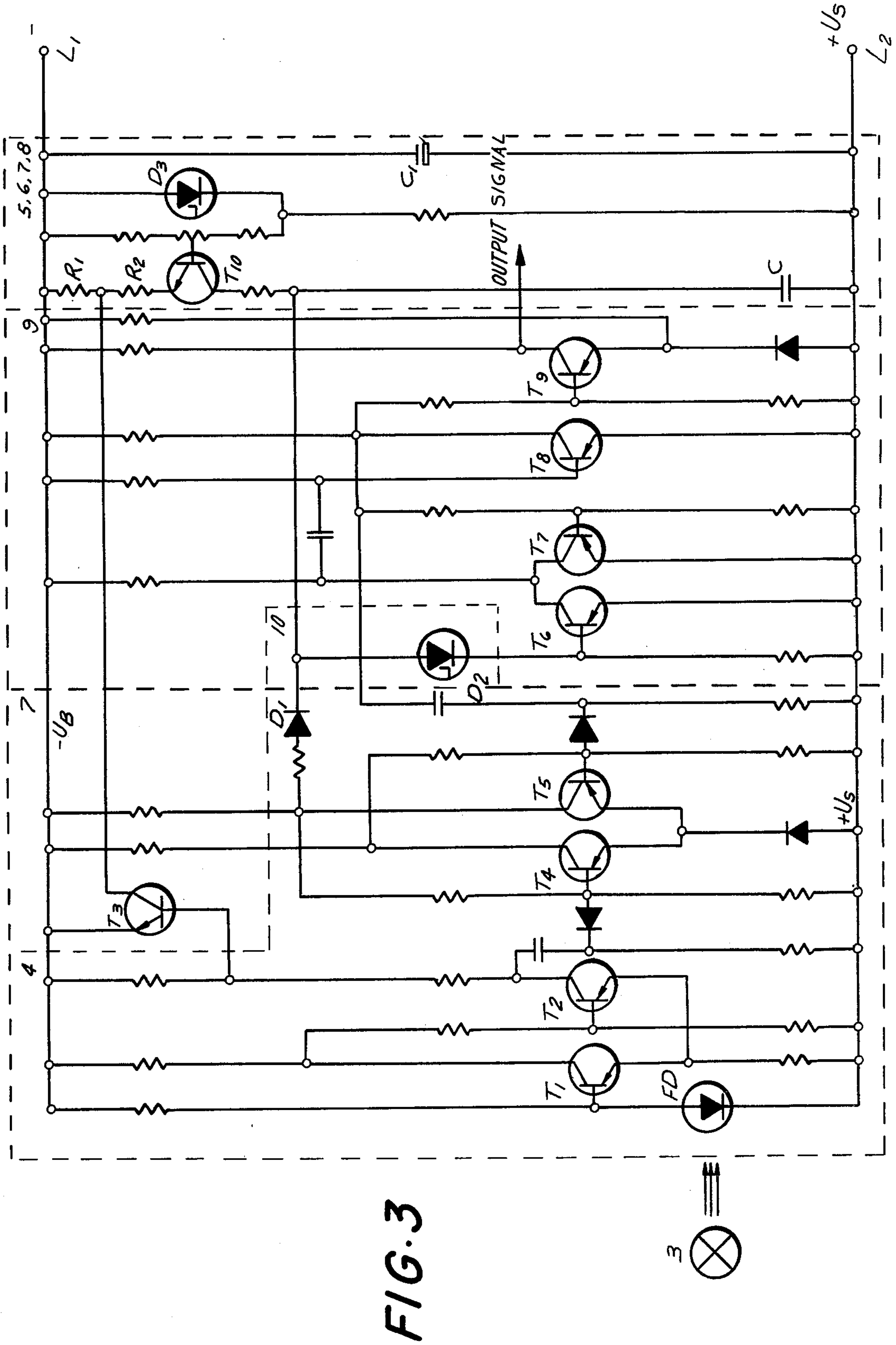
FIG. 3 is a wiring diagram of the device.

The wiring diagram of FIG. 3 gives a detailed picture of the control device of the invention for automatic sorting machines. Such wiring diagram is divided by dash lines to identify the portions thereof forming from left to right the photorelay or photoreceiver 4, the standard voltage source 10, the zero reader 9, and at the extreme right the combined first linear voltage generator 5, the memory 6, the second linear voltage generator 7, and the adder 8. The photorelay 4 includes the photocell Fd, transistors $T_1$–$T_5$, and a diode $D_1$. The standard volt source 10 includes a zener diode $D_2$. The zero reader 9 includes transistors $T_6$–$T_9$. The portion 5, 6, 7, 8 at the right includes transistor $T_{10}$, zener diode $D_3$, and a condenser C, which constitutes the memory.

The circuit shown in FIG. 3 has input terminals $L_1$ and $L_2$ which are supplied with direct current, terminal $L_1$ being negative and terminal $L_2$ being positive. Such terminals are shunted by an electrolytic condenser $C_1$. The common upper wire or bus of the circuits is subjected to a negative DC voltage $-U_b$, and the lowermost wire or bus of the circuit is subjected to a positive direct current voltage $+U_b$.

When the object 1 being tested cuts off the light beam directed toward the photocell 4, the Schmitt trigger $T_1$, $T_2$ is changed over and operates the trigger $T_4$, $T_5$. Accordingly, the collector potential of the transistor $T_5$ becomes almost equal to the potential $+U_b$ in the shunting action of the diode $D_1$ is therefore stopped, while the transistor $T_3$ is plugged and is not shunting the resistor $R_1$. Under these conditions the memory condenser C is charged by the current generator $T_{10}$, so that the voltage of its leads increases at a constant speed $V_u/2$. This speed of charging is reserved for the time when the object clears the path of the light beam from the light source 3, the photocell 4 becomes operative, and the trigger $T_1$, $T_2$ returns to its initial position. Then the transistor $T_3$ shunts the resistor $R_1$ and the speed of voltage generation is twice increased, since $R_1$ is equal to $R_2$. When the voltage of the charge on condenser C reaches the value Uz (Uz being equal to the breakdown voltage of the zener diode $D_2$) the flip-flop $T_6$, $T_7$, $T_8$, which performs the task of a zero member, produces a synchronizing pulse. Such synchronizing pulse is amplified by the transistor $T_9$ and is supplied to output of the control device. At that moment the center of the object 1 is at the point B (FIG. 1). Simultaneously, the trigger $T_4$, $T_5$ is supplied with a negative pulse returning it to its initial position, and the memory condenser C is discharged through the diode $D_1$ and the transistor $T_5$.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A control device adapted for use with an automatic color-sorting machine wherein a plurality of different objects move sequentially along a path which includes a testing area, said control device insuring the synchronization of the testing operations performed by the machine with coincidence between the geometric center of each object and the center of the testing area, said control device including a light source and a photorelay spaced from each other on opposite sides of the path of the objects, the light beam from the light source being directed toward the photorelay and interrupted by the passage of each object, and a computing circuit coupled to the photorelay, said computing circuit comprising a first linear-voltage generator, a second linear-voltage generator, circuit means coupling the output of the photorelay to the respective inputs of the first and second generators, a memory device, circuit means coupling the output of the first generator to the memory device, an adder, circuit means coupling the adder to the outputs of the memory device and the second generator, a reference voltage source, a zero reader, and circuit means connecting the outputs of the adder and of the reference voltage source to the zero reader, the second linear-voltage generator having a speed of voltage-increase which is twice that of the first linear-voltage generator.

2. A control device according to claim 1, wherein the light source and the photorelay are both located outside the testing area of the automatic color-sorting machine.

3. A control device according to claim 1, wherein the first and second linear-voltage generators, the memory device, and the adder are integrated in a single linear-voltage generator in which the speed of linearly increasing voltage is cyclically sequentially altered so that the voltage increase alternately takes place at first and second speeds, the ratio between the first and second speeds being 2:1.

* * * * *